UNITED STATES PATENT OFFICE.

JOHN AGOSTINI, OF NEW YORK, N. Y.

PYROTECHNIC COMPOUND.

SPECIFICATION forming part of Letters Patent No. 523,614, dated July 24, 1894.

Application filed April 12, 1894. Serial No. 507,306. (No specimens.)

*To all whom it may concern:*

Be it known that I, JOHN AGOSTINI, a subject of the Emperor of Austria-Hungary, residing at New York, in the county and State of New York, have invented new and useful Improvements in Fireworks, of which the following is a specification.

This invention relates to a composition of matter suitable for the manufacture of fireworks as set forth in the following specification and claims.

My composition consists of the following ingredients combined in substantially the proportions stated. One and a quarter ($1\frac{1}{4}$) pounds metallic magnesium. Five (5) pounds starch. One and a half ($1\frac{1}{2}$) pounds wood charcoal. One pound metallic filings.

The composition is prepared as follows: The magnesium in a comminuted or powdered condition is thoroughly mixed with the charcoal likewise powdered, and the starch is then added to and mixed thoroughly with the mass. This mixture is rendered adhesive by the addition of a suitable solution of dextrine and gum arabic, such solution being formed by two pounds of dextrine and one pound gum arabic with enough water to give the solution a pasty consistency, such as that of the mucilage of commerce. To the mixture of magnesium, starch and charcoal are added the above adhesive solution and the whole thoroughly mixed, and the metallic filings such as iron or steel filings are then added and thoroughly mixed with the mass.

This compound can be spread upon a sheet of paper or other substance, or stems or stalks of wood or other substances can be dipped into the compound so as to cause part thereof to adhere to such stem or stick. During the dipping the compound should be maintained at such consistence that a sufficient thickness thereof, say about one thirty-second of an inch will adhere to the dipped stem. Should the consistence of the compound at any time become too great, the requisite dilution can be readily obtained by adding dextrine water as required.

The compound when ignited will burn with a bright light emitting sparks or stars, and is serviceable for amusement or celebration, or if desired can be used for signaling.

It should be noted that the iron or steel filings should be protected against rust in case the compound is not to be used at once. A suitable coating will afford such protection. By mixing for example two ounces of raw linseed oil and one half of an ounce paraffine in a hot or melted condition and mixing a pound of metal filings into this hot or fused mixture, the filings will become coated or protected and can then in this condition be added to the above named pyrotechnic compound.

The magnesium, starch, charcoal and metal filings without the addition of any other substance might be mixed in the form of a dry powder and packed or ignited in a metallic or non combustible box or receptacle or strewed over the ground and ignited but I prefer to add an adhesive for attaching the compound to a base or stem.

What I claim as new, and desire to secure by Letters Patent, is—

1. The herein described composition of matter to be used for pyrotechnic purposes consisting of magnesium, starch, charcoal and iron filings substantially in the proportions specified.

2. The herein described method of manufacturing a pyrotechnic compound, which method consists in mixing powdered magnesium and charcoal with starch, rendering said mixture adhesive, coating or protecting iron filings with a substance impervious to moisture, and adding said filings to the mixture substantially as described.

In testimony whereof I have hereunto set my hand in the presence of two subscribing witnesses.

JOHN AGOSTINI.

Witnesses:
JULIUS LUTTGE,
E. F. KASTENHUBER.